A. B. ANDERSON AND J. L. PETERSEN.
HAY RACK BED PIECE.
APPLICATION FILED MAY 1, 1918.

1,307,841.

Patented June 24, 1919.

WITNESSES

INVENTORS
ANDREW B. ANDERSON
JOHN L. PETERSEN
BY
ATTORNEYS

UNITED STATES PATENT OFFICE.

ANDREW B. ANDERSON AND JOHN L. PETERSEN, OF LAKE MILLS, IOWA.

HAY-RACK BED-PIECE.

1,307,841.        Specification of Letters Patent.     Patented June 24, 1919.

Application filed May 1, 1918. Serial No. 231,902.

*To all whom it may concern:*

Be it known that we, ANDREW B. ANDERSON, a citizen of the United States, and JOHN L. PETERSEN, a citizen of the Kingdom of Denmark, residents of Lake Mills, Winnebago county, Iowa, have invented certain new and useful Improvements in Hay-Rack Bed-Pieces, of which the following is a specification.

The object of our invention is to provide an attachment for the bed of a hay rack to strengthen the forward portion thereof and allow the forward wheels to swing under the bed in turning.

A further object is to provide an attachment which can be applied easily and quickly to any style of rack in general use.

The invention consists generally in various constructions and combinations, all as hereinafter described and particularly pointed out in the claims.

Figure 2:
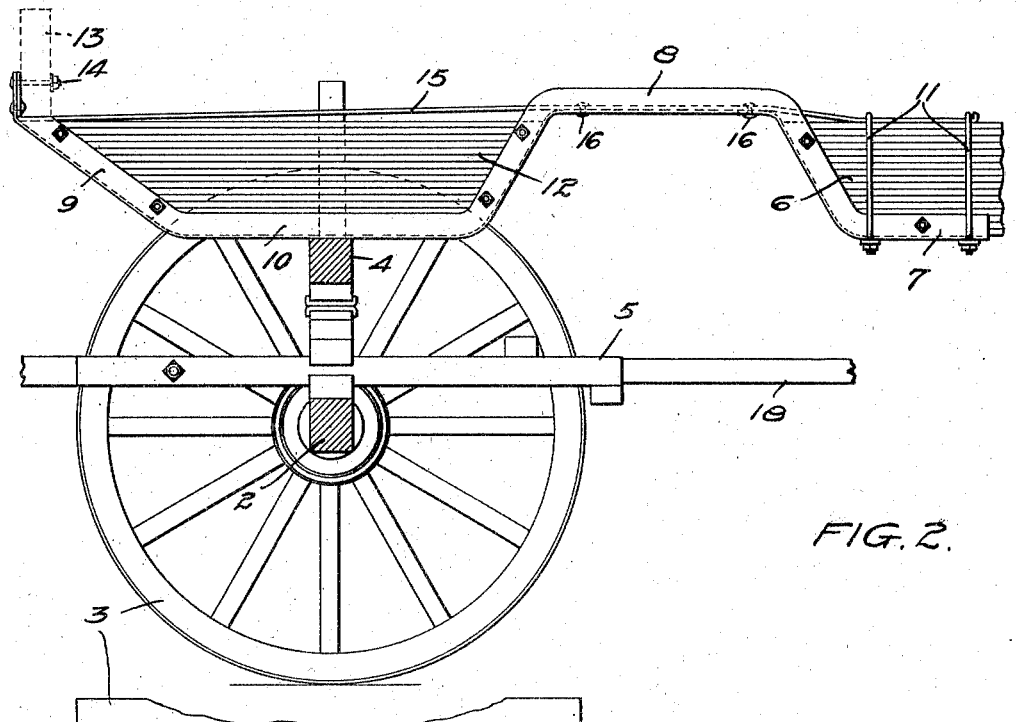
Figure 1:
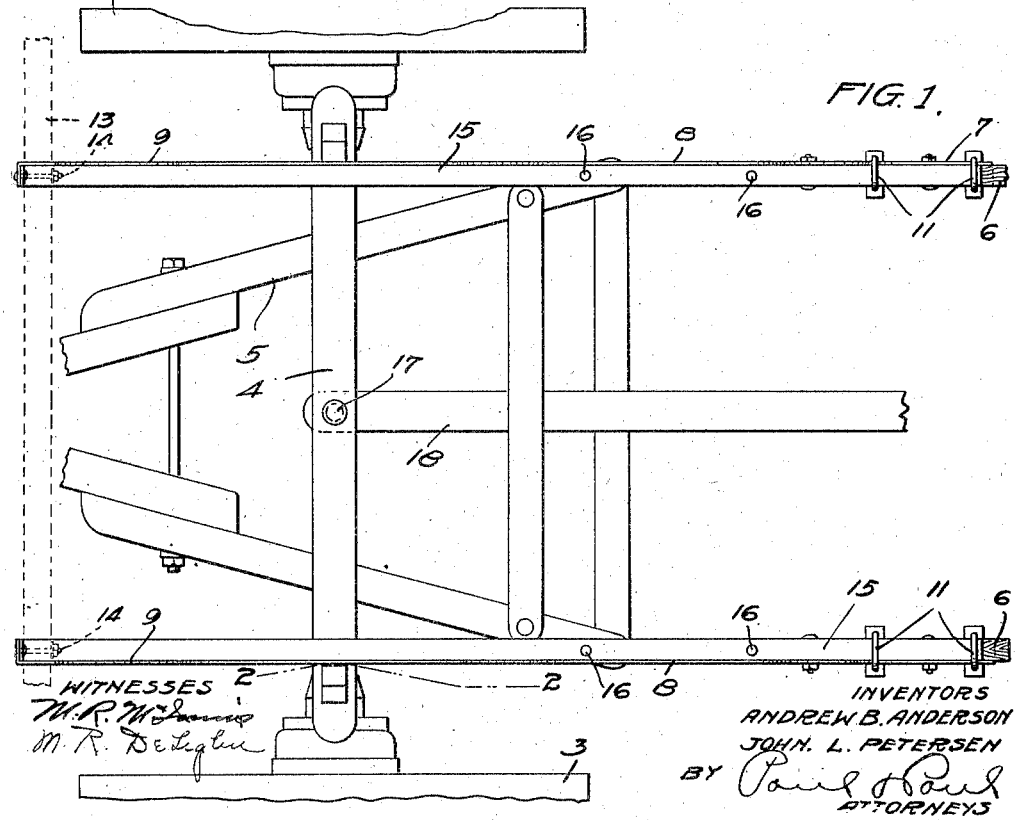

In the accompanying drawings forming part of this specification,

Figure 1 is a plan view of the forward portion of the rack with our invention applied thereto, Fig. 2 is a sectional view on the line 2—2 of Fig. 1.

In the drawing, 2 represents the forward axle having carrying wheels 3, a bolster 4 and draft rigging 5. 6 represents the forward ends of the bed rails or side sills of the rack. To these forward ends we secure the extensions, which consist preferably of angle bars 7 having arched or raised portions 8 and upwardly turned forward ends 9 between which and the arched portions 8 is a horizontal section 10. The rear ends 7 are secured to the sills 6 by suitable means, such as U-bolts 11, and the spaces between the arched portions 8 and the ends 9 is filled by the block 12, preferably of wood, that is bolted to a flange of the extensions. A cross bar 13 is provided at the forward ends of the upwardly turned parts 9 and secured thereto by bolts 14, and metal strips 15 have their forward ends upwardly turned and secured to the cross bar 13 and extend backwardly over the filler blocks 12 and are riveted at 16 to the horizontal flange of the arched portions 8 and have their rear ends seated on the sills 6 and clamped securely thereon by means of the U-bolts 11. The horizontal section 10 rests on the bolster 4 and a king bolt 17 connects the reach 18 with the bolster and forward axle.

In building a new rack, the extension bars 7 will be clamped to the forward ends of the sills in the manner shown, but in applying the device to a rack already built, we cut off the forward ends of the sills back a sufficient distance in the rear of the forward wheels and then clamp the angle rails thereto so that their horizontal sections will rest upon the bolster and their arched portions be in position to allow the forward wheels to swing in under the sills of the rack. These extensions of the sills may be made in different sizes and of different weights of metal, according to the size of the rack and the load, and in general the details of construction may be modified, the essential idea being the metallic extensions for the side sills of the rack which will allow the forward wheels to swing freely under the rack in turning.

We claim as our invention:

1. The combination, with a rack side sills, of an extension secured thereto and adapted to rest upon the forward axle bolster, said extension comprising angle bars secured at one end to the forward ends of said rack sills and having arched portions near and in front of said sills sufficient to allow the forward wheels of the rack to be turned in under the sills, said side rails having horizontal portions in front of said arched portions to rest upon the forward axle bolster, said horizontal portions terminating in upwardly turned ends and a cross bar securing said ends together across the forward end of the rack, and filler plates fitting said angle bars between said arched portions and said upwardly turned forward ends, the upper edges of said filler blocks being on a level substantially with the top of said side sills.

2. The combination, with a rack side sills, of an extension secured thereto and adapted to rest upon the forward axle bolster, said extension comprising angle bars secured at one end to the forward ends of said rack sills and having arched portions near and in front of said sills sufficient to allow the forward wheels of the rack to be turned in under the sills, said side rails having horizontal portions in front of said arched portions to rest upon the forward axle bolster, said horizontal portions terminating in upwardly turned ends and a cross bar securing said ends together across the forward end of the rack, filler plates fitting said angle bars between said arched portions and said upwardly turned forward ends, the upper edges of said filler blocks being on a level substantially with the top of said side sills, and straps secured to said upwardly turned forward ends and the top of said arched portions and the forward ends of said side sills.

3. The combination, with a rack side sills, of bars having seats at one end for the forward ends of said side sills and secured thereto, said bars having arched portions against which the ends of said sills are seated and said bars having horizontal portions forming a continuation of said arched portions and adapted to be seated on the axle bolster, said horizontal portions terminating in upwardly turned ends having a cross bar between them, filler plates fitting the recesses between said upwardly turned ends and said arched portions and secured to said bars and on a level substantially with the top of said arched portions and said sills.

In witness whereof we have hereunto set our hands this 16" day of April, 1918.

ANDREW B. ANDERSON.
  JOHN L. PETERSEN.

Witnesses:
 J. M. TAPAGER,
 D. J. SEVERSON.

Copies of this patent may be obtained for five cents each, by addressing the "Commissioner of Patents, Washington, D. C."